US012103263B2

(12) United States Patent
Kumamoto

(10) Patent No.: US 12,103,263 B2
(45) Date of Patent: Oct. 1, 2024

(54) BAG MAKING APPARATUS AND BAG MAKING METHOD

(71) Applicant: Totani Corporation, Kyoto (JP)

(72) Inventor: Yuji Kumamoto, Kyoto (JP)

(73) Assignee: Totani Corporation, Kyoto (JP)

( * ) Notice: Subject to any disclaimer, the term of this patent is extended or adjusted under 35 U.S.C. 154(b) by 0 days.

(21) Appl. No.: 18/039,972

(22) PCT Filed: Oct. 7, 2021

(86) PCT No.: PCT/JP2021/037163
§ 371 (c)(1),
(2) Date: Jun. 2, 2023

(87) PCT Pub. No.: WO2022/153623
PCT Pub. Date: Jul. 21, 2022

(65) Prior Publication Data

US 2024/0017514 A1 Jan. 18, 2024

(30) Foreign Application Priority Data

Jan. 18, 2021 (JP) ................................ 2021-005619

(51) Int. Cl.
*B31B 70/00* (2017.01)
*B31B 70/04* (2017.01)
(Continued)

(52) U.S. Cl.
CPC ............ *B31B 70/04* (2017.08); *B31B 70/004* (2017.08); *B31B 70/006* (2017.08); *B31B 70/142* (2017.08); *B31B 70/20* (2017.08)

(58) Field of Classification Search
CPC ................................ B31B 70/04; B31B 70/20
See application file for complete search history.

(56) References Cited

U.S. PATENT DOCUMENTS

2019/0030850 A1* 1/2019 Tan ......................... B31B 70/14
2021/0001584 A1* 1/2021 Tan ...................... B65D 33/001
2023/0330961 A1* 10/2023 Totani ................... B31B 70/006

FOREIGN PATENT DOCUMENTS

EP 2505347 10/2012
JP 2008100466 5/2008
(Continued)

*Primary Examiner* — Eyamindae C Jallow
(74) *Attorney, Agent, or Firm* — JCIPRNET

(57) ABSTRACT

A bag making apparatus includes an intermittent feed device for feeding sheet panels, an adjustment device for detecting upper and lower thresholds for a length of the sheet panels included in a section from a first drive roller pair to a second drive roller pair, a movement device for moving a processing device and a sensor together as a movable group in the longitudinal direction of the sheet panels. The movement device moves the movable group upstream in response to the adjustment device detecting the upper threshold and moves the movable group downstream in response to the adjustment device detecting the lower threshold. If the movable group is moved, the intermittent feed device determines an intermittent feed distance based on a moving distance of the movable group in addition to output from the sensor and feeds the sheet panels by the determined distance using the first drive roller pair.

9 Claims, 5 Drawing Sheets

(51) Int. Cl.
*B31B 70/14* (2017.01)
*B31B 70/20* (2017.01)

(56) References Cited

FOREIGN PATENT DOCUMENTS

| | | |
|---|---|---|
| JP | 2010105186 | 5/2010 |
| JP | 2012206458 | 10/2012 |
| JP | 2015221538 | 12/2015 |
| JP | 2019196238 | 11/2019 |

* cited by examiner

BAG MAKING APPARATUS AND BAG MAKING METHOD

CROSS-REFERENCE TO RELATED APPLICATION

This application is a 371 application of an international PCT application serial no. PCT/JP2021/037163, filed on Oct. 7, 2021, which claims the priority benefit of Japan application JP2021-005619, filed on Jan. 18, 2021. The entirety of each of the above-mentioned patent applications is hereby incorporated by reference herein and made a part of this specification.

TECHNICAL FIELD

This application relates to a bag making apparatus and a bag making method for successively making bags from at least two continuous sheet panels.

BACKGROUND

Such bag making apparatuses and bag making methods are disclosed, for example, in Patent documents 1 to 3. At least two continuous sheet panels are intermittently fed. The continuous sheet panels are processed every intermittent feed cycle. For example, the continuous sheet panels are heat-sealed in their width direction by a cross seal device, and cross-cut in their width direction by a cross cut device. A bag is shaped every cross-cutting.

The sheet panels with patterns repeatedly printed thereon at a print pitch may be used. What is important in making bags with print patterns is that the sheet panels (their print patterns) should be positioned with high accuracy during a pause phase of an intermittent feed cycle with respect to the processing devices, such as the cross seal device, the cross cut device. If the sheet panels are processed (e.g., heat-sealed, cross-cut) at a position displaced from the design position, the quality and appearance of the resulting bags may be compromised.

Through various processes, such as heat sealing, the sheet panels may stretch or shrink locally and over time due to temperature and other environmental conditions to cause variations in the print pitch, which affects the accuracy of the positioning. Due to the quality of the sheet panels used, the print pitch of the print patterns may vary, which also affects the accuracy of the positioning.

Patent document 1 discloses that a sensor for detecting marks on the sheet panel and a pair of drive rollers for intermittently feeding the sheet panels are provided for each of the processing devices, such as a cross heat seal device and a cross cut device. The pair of drive rollers is controlled based on the output of the sensor such that the sheet panels are positioned with respect to the processing device associated with this sensor and this pair of drive rollers. In this manner, the sheet panels are positioned with high accuracy with respect to each processing device.

With such intermittent feed control, if the amount of intermittent feed of the sheet panels differs between the pair of drive rollers and the next downstream pair of drive rollers, the tension of the sheet panels may vary in the section between these pairs to exceed the upper or lower allowable limit value. This may result in a problem that bag making fails to continue. Patent document 1 addresses this by providing a dancer roller between these pairs of drive rollers to temporarily accumulate the sheet panels using the dancer roller. Various tension management methods have been studied.

The components of the bags, such as a sheet panel, a gusset are typically laminated films, which have both high rigidity and durability. Alternatively, mono-material or hybrid material consisting of a paper base and a resin coating the base has been attracting attention as material for bags in view of the environmental aspects.

Mono-material is, for example, polyethylene, polypropylene, etc. Mono-material is higher stretchable than laminated films. Thus, mono-material facilitates tension-based positioning, whereas it requires a mechanism that addresses the case where the tension of the sheet panels exceeds the allowable range.

Paper-based hybrid material is lower stretchable. Thus, such hybrid material makes positioning under tension control difficult. If there is unevenness in the print pitch of the sheet panels, it is difficult to perform control for positioning to address this unevenness.

CITATION LIST

Patent Document

Patent document 1: JP2008-100466A.
Patent document 2: JP2012-206458A.
Patent document 3: JP2010-105186A.
Patent document 4: JP 2019-196238A.
Patent document 5: JP2015-221538A.

SUMMARY

It is an object of the present application to achieve both positioning of sheet panels with respect to processing devices and management of tension of the sheet panels in a novel manner.

According to an aspect of the present application, there is provided a bag making apparatus for cross-cutting at least two continuous sheet panels in a width direction of the sheet panels to successively make bags from the sheet panels, at least one of the sheet panels including marks repeatedly printed thereon, the bag making apparatus including: an intermittent feed device configured to feed the sheet panels in a longitudinal direction of the sheet panels in a state in which the sheet panels are superposed on each other; at least one first processing device configured to process the sheet panels during every pause phase of an intermittent feed cycle; at least one second processing device configured to process the sheet panels during every pause phase of an intermittent feed cycle; and an adjustment device disposed downstream of the at least one first processing device and upstream of the at least one second processing device, the intermittent feed device including: a first sensor disposed upstream of the adjustment device to detect the marks; a first pair of drive rollers disposed upstream of the adjustment device to feed the sheet panels in the longitudinal direction of the sheet panels; a second sensor disposed downstream of the adjustment device to detect the marks; and a second pair of drive rollers disposed downstream of the adjustment device to feed the sheet panels in the longitudinal direction of the sheet panels, the intermittent feed device being configured to: control the first pair of drive rollers based on output of the first sensor to position the sheet panels with respect to the at least one first processing device when pausing the sheet panels; and control the second pair of drive rollers based on output of the second sensor to position the sheet panels with respect to the at least one second processing device when pausing the sheet panels, wherein the adjustment device is configured to detect an upper threshold and a lower threshold for a length of the sheet panels included in a section from the first pair of drive rollers to the second pair of drive rollers, wherein the bag making apparatus further includes a movement device for moving the at least one first processing device and the first sensor together as a movable group in the longitudinal direction of the sheet panels, wherein the movement device is configured to move the movable group upstream in response to the adjustment device detecting the upper threshold and to move the movable group downstream in response to the adjustment device detecting the lower threshold, and wherein the intermittent feed device is further configured to, if the movable group is moved, determine an intermittent feed distance based on a moving distance of the movable group in addition to the output from the first sensor to feed the sheet panels by the determined intermittent feed distance using the first pair of drive rollers.

The at least one first processing device may include: a cross seal device configured to heat-seal the sheet panels in the width direction of the sheet panels during every pause phase of an intermittent feed cycle; and a cooling device configured to, during every pause phase of an intermittent feed cycle, cool an area that has been heat-sealed by the cross seal device.

The at least one second processing device may include a cross cut device configured to cross-cut the sheet panels in the width direction of the sheet panels during every pause phase of an intermittent feed cycle.

The at least one second processing device may further include at least one punching machine configured to punch the sheet panels during every pause phase of an intermittent feed cycle.

The at least one punching machine may include at least one of a notch forming device for forming notches of the bags or a corner cut forming device for forming corner cut parts of the bags.

The adjustment device may include: two guide rollers spaced from one another in the longitudinal direction of the sheet panels to engage with the sheet panels; a control roller located between the two guide rollers to engage with the sheet panels; a biasing member for biasing the control roller towards the sheet panels; and a position sensor for detecting a position of the control roller corresponding to the upper threshold and a position of the control roller corresponding to the lower threshold.

According to another aspect of the present application, there is provided a bag making method for cross-cutting at least two sheet panels in a width direction of the sheet panels to successively make bags from the sheet panels, at least one of the sheet panels including marks repeatedly printed thereon, the bag making method including: intermittently feeding the sheet panels in a longitudinal direction of the sheet panels using a first pair of drive rollers and a second pair of drive rollers disposed downstream of the first pair of drive rollers, the sheet panels being superposed on each other; detecting a length of the sheet panels included in a section from the first pair of drive rollers to the second pair of drive rollers using an adjustment device located in the section; processing the sheet panels during every pause phase of an intermittent feed cycle using at least one first processing device disposed upstream of the adjustment device; and processing the sheet panels during every pause phase of an intermittent feed cycle using at least one second processing device disposed downstream of the adjustment device, the step of intermittently feeding the sheet panels including: detecting a mark using a first sensor disposed upstream of the adjustment device; controlling the first pair of drive rollers based on output of the first sensor to position the sheet panels with respect to the at least one first processing device when pausing the sheet panels; detecting a mark using a second sensor disposed downstream of the adjustment device; and controlling the second pair of drive rollers based on output of the second sensor to position the sheet panels with respect to the at least one second processing device when pausing the sheet panels, the bag making method further including: moving the at least one first processing device and the first sensor together as a movable group upstream using a movement device in response to the length reaching a predetermined upper threshold; moving the movable group together downstream using the movement device in response to the length reaching a predetermined lower threshold; and determining an intermittent feed distance based on a moving distance of the movable group in addition to the output from the first sensor to feed the sheet panels by the determined intermittent feed distance using the first pair of drive rollers if the movable group is moved.

Each of the sheet panels may be a film made of monomaterial.

The at least one first processing device may include: a cross seal device configured to heat-seal the sheet panels in the width direction of the sheet panels during every pause phase of an intermittent feed cycle; and a cooling device configured to, during every pause phase of an intermittent feed cycle, cool an area that has been heat-sealed by the cross seal device, and wherein the at least one second processing device may include a cross cut device configured to cross-cut the sheet panels in the width direction of the sheet panels during every pause phase of an intermittent feed cycle.

DETAILED DESCRIPTION

The implementations according to the present application will be described below with reference to the drawings.

Figure 1A:
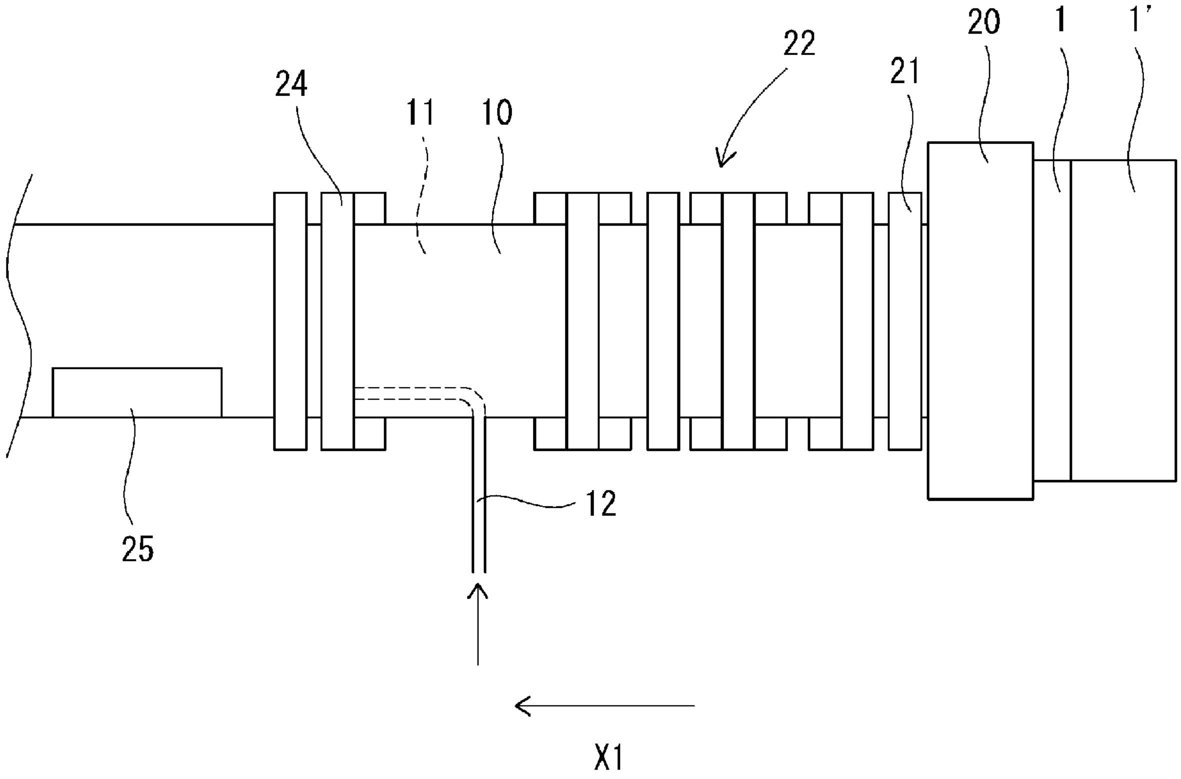
FIG. 1A is a schematic plan view of an upstream section of an example bag making apparatus.
Figure 1B:
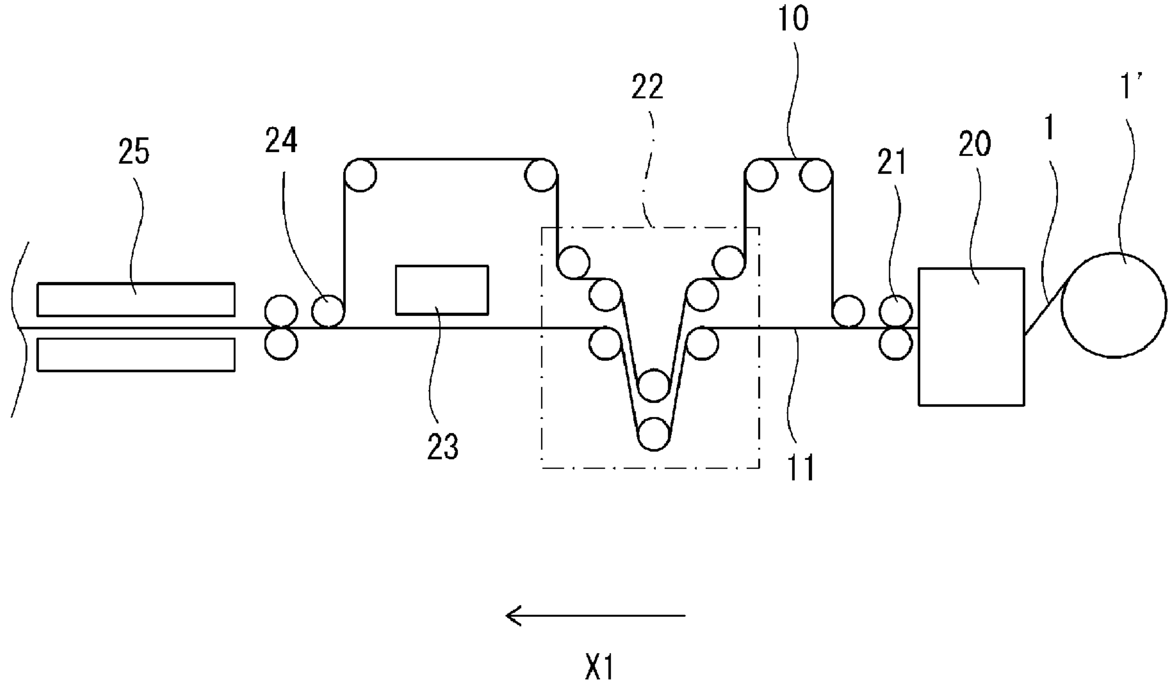
FIG. 1B is a front view of it.

FIG. 1A and FIG. 1B schematically illustrate an upstream section of an example bag making apparatus. A wide web 1 is continuously unrolled from a roll 1' at a constant speed by a pair of drive rollers 21, fed through an accumulator 20, and then slit in its longitudinal direction into two continuous sheet panels 10 and 11. These sheet panels 10 and 11 are fed facing each other vertically. The feed direction of the sheet panels 10 and 11 is designated by the reference sign X1. The sheet panels 10 and 11 are, for example, plastic films.

Each of the sheet panels 10 and 11 may be a laminated film including a base layer and a sealant layer, or a film made of mono-material such as polyethylene (PE) or polypropylene (PP). Laminated films are durable and less stretchable. Polyester-type or polyethylene-type mono-material is easy to recycle, environmentally friendly, has a low melting point, and is high stretchable. As an alternative to such films, each of the sheet panels 10 and 11 may include a paper base and a resin layer coating on the paper base.

The sheet panels 10 and 11 are then fed through a dancer device 22. The dancer device 22 appropriately switches the feed of the sheet panels 10 and 11 from continuous feed to intermittent feed. Therefore, the sheet panels 10 and 11 are intermittently fed in the section downstream of the dancer device 22 by an intermittent feed device 4 (FIG. 2A, FIG. 2B), which will be described below. In other words, the sheet panels 10 and 11 are fed, paused, and then fed again. This feed and pause are repeated alternately.

A component supply device 23 (FIG. 1B) is disposed downstream of the dancer device 22. The component supply device 23 guides an accessory component(s) 12 (FIG. 1A) to supply it to the space between the sheet panels 10 and 11 using a suitable guide member(s). The accessory component 12 is, for example, a continuous zipper. Hereafter, the implementations that the zipper is used as an accessory component 12 are described below.

The sheet panels 10 and 11 are guided to the guide roller 24 to be superposed on each other at the guide roller 24. The sheet panels 10 and 11 are then intermittently fed by the intermittent feed device 4 in the superposed state. When the sheet panels 10 and 11 are superposed on each other, the zipper 12 is interposed between the sheet panels 10 and 11.

A zipper seal device 25 is disposed downstream of the guide roller 24. The zipper seal device 25 heat-seals the male and female members of the zipper 12 to the sheet panels 10 and 11, respectively, using heat seal members or the like, during every pause phase of an intermittent feed cycle.

Figure 2A:
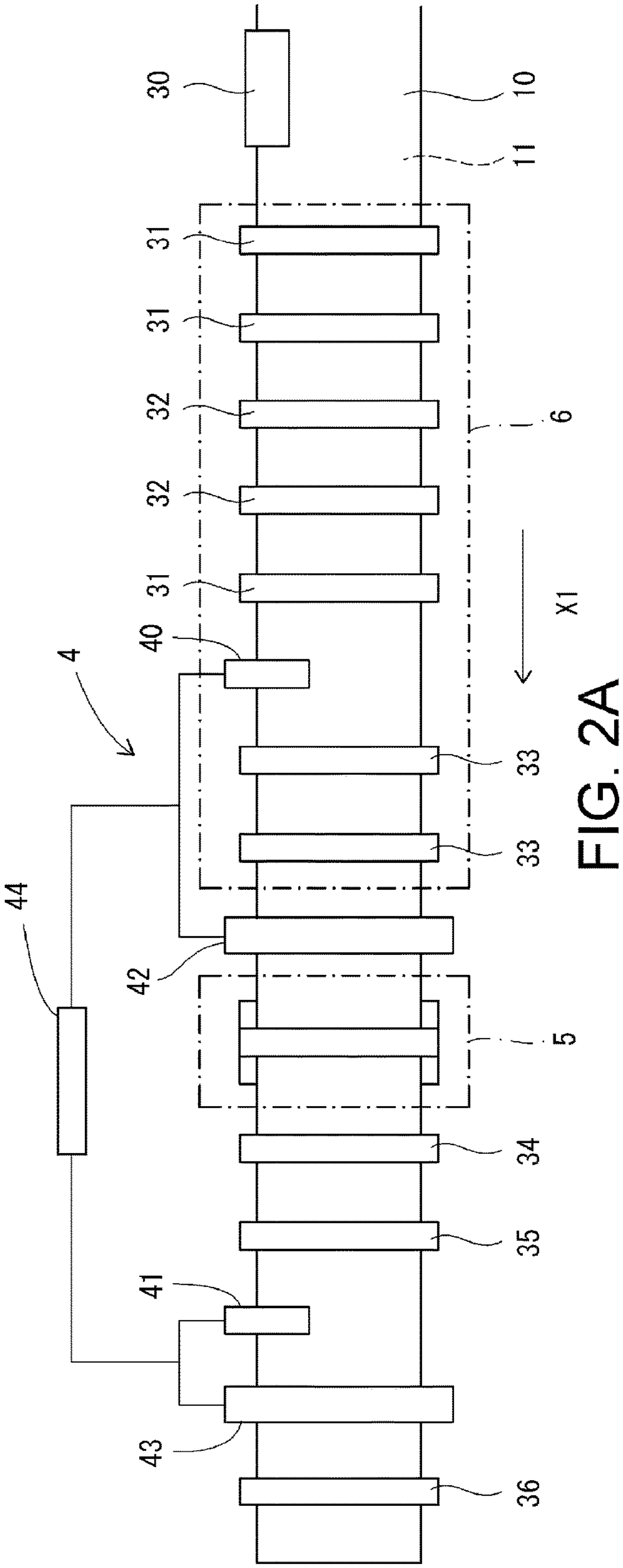
FIG. 2A is a schematic plan view of a downstream section of the example bag making apparatus.
Figure 2B:
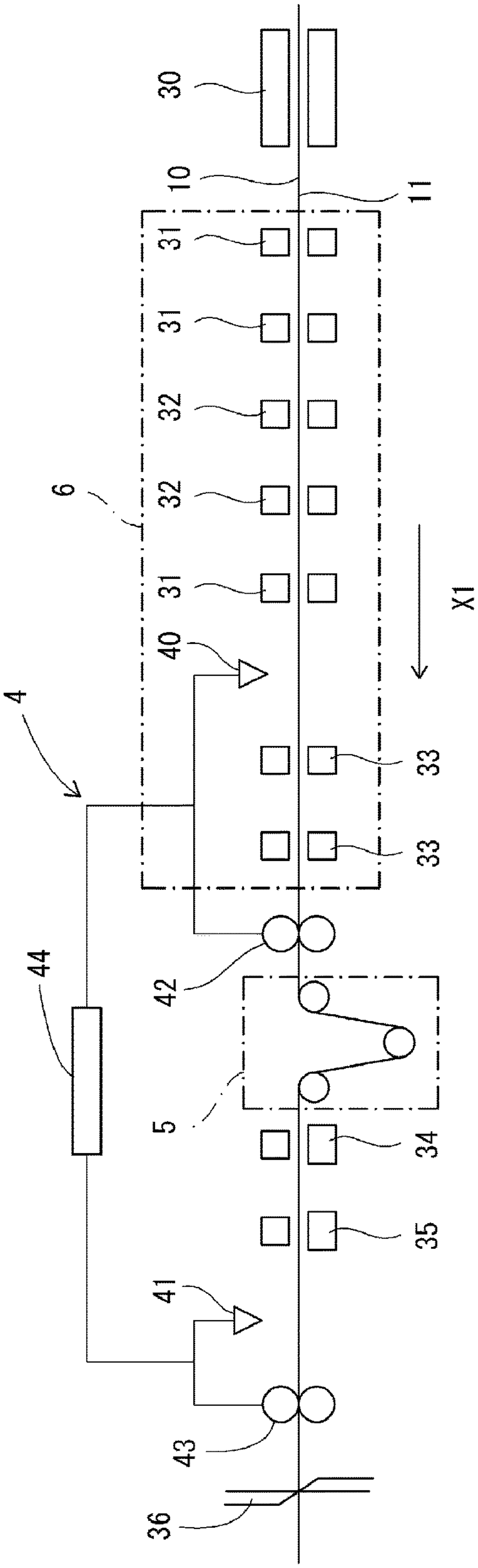
FIG. 2B is a front view of it.

FIG. 2A and FIG. 2B schematically illustrate a downstream section of the example bag making apparatus. The bag making apparatus includes an intermittent feed device 4. The intermittent feed device 4 intermittently feeds the continuous sheet panels 10 and 11 in the longitudinal direction of the sheet panels 10 and 11. The intermittent feed device 4 will be described in more detail below.

Figure 3A:
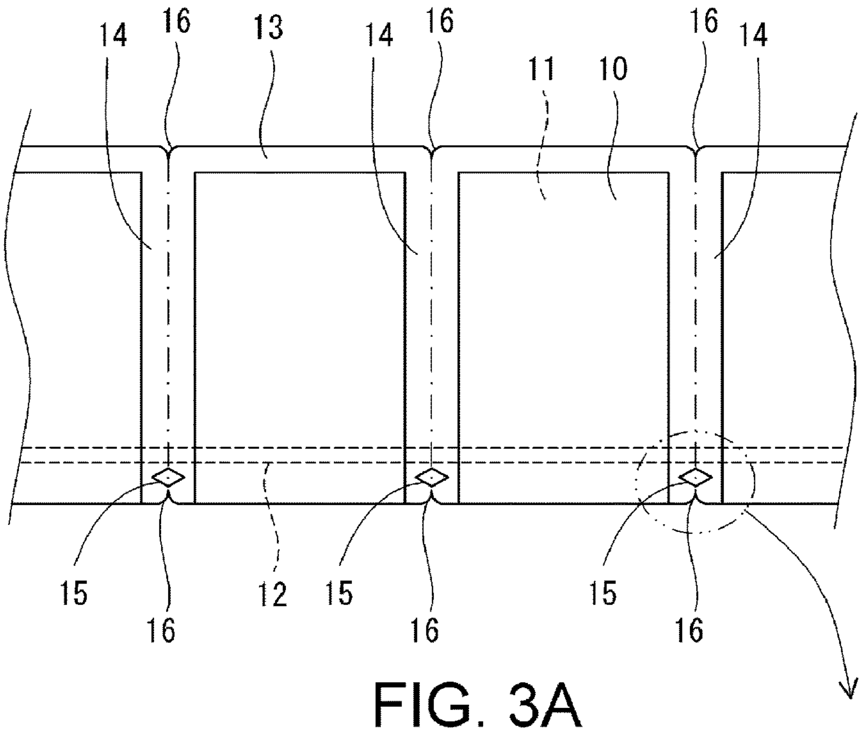
FIG. 3A is a schematic view of an example processed sheet panels.

The bag making apparatus includes a longitudinal seal device 30. The longitudinal seal device 30 heat-seals the sheet panels 10 and 11 in the longitudinal direction of the sheet panels 10 and 11 using heat seal members or the like during every pause phase of an intermittent feed cycle. The longitudinal sealing position is at one side edge of the sheet panels 10 and 11 distal to the zipper 12 (not illustrated in FIG. 2A and FIG. 2B). A longitudinal sealed section 13 (FIG. 3A) is thereby formed.

The bag making apparatus further includes at least one cross seal device 32 disposed downstream of the longitudinal seal device 30. Multiple (e.g., two) cross seal devices 32 are provided. The cross seal devices 32 heat-seal the sheet panels 10 and 11 in the width direction of the sheet panels 10 and 11 using heat seal bars or the like during every pause phase of an intermittent feed cycle. A cross sealed section 14 (FIG. 3A) is thereby formed.

The bag making apparatus further includes at least one point seal device 31. Multiple (e.g., three) point seal devices 31 are provided. Two point seal devices 31 of the three are disposed upstream of the cross seal devices 32, and the other point seal device 31 is disposed downstream of the cross seal devices 32. The point seal devices 31 locally heat and pressurize the zipper 12 using heat seal members or the like to crush it locally during every pause phase of an intermittent feed cycle. Such point seal devices 31 are disclosed, for example, in Patent document 4. The point sealing position is an area where the cross sealed section 14 is formed.

The bag making apparatus further includes at least one cooling device 32 disposed downstream of the cross seal devices 32 and the point seal devices 31. Multiple (e.g., two) cooling devices 33 are provided. The cooling devices 33 cool the area which has been heat-sealed by the cross seal device 32 (i.e., the cross sealed section 14), using cooling members or the like during every pause phase of an intermittent feed cycle.

The bag making apparatus further includes punching machines 34 and 35 disposed downstream of the cooling devices 33. For example, a notch forming device 34 and a corner cut device 35 are used as the punching machines. The notch forming device 34 punches a hole 15 (FIG. 3A) for notches in the sheet panels 10 and 11 using a punch blade or the like during every pause phase of an intermittent feed cycle. The punching position is within the cross sealed section 14.

The corner cut device 35 punches the sheet panels 10 and 11 using a punch blade or a Thomson cutter to form corner cut parts 16 (FIG. 3A) during every pause phase of an intermittent feed cycle. The punching position is at both ends of the cross sealed section 14.

The bag making apparatus further includes a cross cut device 36 disposed downstream of the punching machines 34 and 35. The cross cut device 36 cross-cuts the sheet panels 10 and 11 and the zipper 12 in the width direction of the sheet panels 10 and 11 using a cutter or the like during every pause phase of an intermittent feed cycle. The cross-cutting position is in the position of the cross sealed section 14. The bag is shaped every cross-cutting from the part which has been cut off during cross-cutting.

Figure 3B:
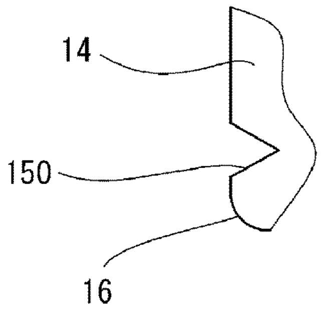
FIG. 3B is a partially enlarged view of a two-dotted area in FIG. 3A after cross-cutting.

Thus, the longitudinal sealed section 13 is located along one edge of the bag. The cross sealed sections 14 are located along both sides of the bag. The zipper 12 allows the bag to be freely opened and closed. The crushed sections of the zipper 12 are located on the opposite sides of the bag (cross sealed sections 14), thereby providing the bag with tight seal (see, e.g., Patent document 4). The hole 15 for notches is divided into two through cross-cutting, resulting in the notches 150 for opening the bag (see FIG. 3B). The corner cut parts 16 are located at the four corners of the bag, thereby providing the bag with safety. The sealed sections 13 and 14 can also be elements that affect the appearance of the bag, since they remain as traces in the bag.

Figure 4:
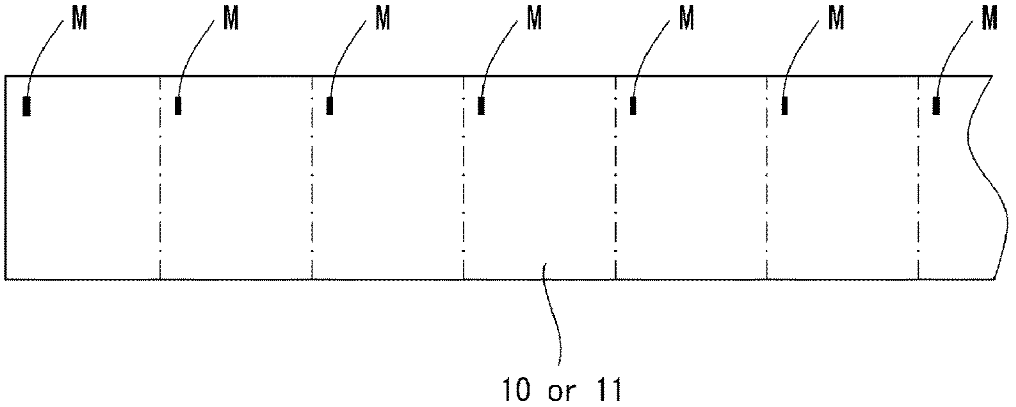
FIG. 4 illustrates example marks repeatedly printed on a sheet panel.

Although not illustrated, the sheet panels 10 and 11 have patterns printed thereon repeatedly in their longitudinal direction at a print pitch, so that the bags each with the print pattern are made. As illustrated in FIG. 4, a mark M is included in each print pattern of the sheet panel and/or the sheet panel 11. In other words, the marks M are repeatedly printed on at least one of the sheet panel 10 or the sheet panel 11 at the print pitch. The mark M may be part of the print pattern. The mark M may be a contrast changing point included in each print pattern, as disclosed, for example, in WO 2020/026620.

In order to intermittently feed the sheet panels 10 and 11 at the print pitch, the intermittent feed device 4 includes a first sensor 40, a second sensor 41, a first pair of drive rollers 42, a second pair of drive rollers 43, and a control unit 44.

The first sensor 40 is disposed downstream of the cross seal devices 32 and upstream of the cooling devices 33 to detect the marks M. An optical sensor is used as the first sensor 40.

The first sensor 40 detects, at its reference position, a mark M on the sheet panel 10 while the sheet panel 10 is being paused after fed in an intermittent feed cycle. At this time, if the mark M is paused after passing through the reference position, it measures the distance by which the mark M has passed (the mark M has advanced). If the mark M is not detected, that is, does not reach the reference position, the first sensor 40 is moved upstream until it detects the mark M, and measures its moving amount, and then is moved back to the reference position.

On the sheet panel, the dimension between the mark(s) M and a line(s) to be cross-cut (hereinafter referred to as "cross-cut line") is predetermined. In an adjustment device 5 described below, the first sensor 40 is positioned such that a mark M is located at the detection area (reference position) of the first sensor 40 when the cross cutting position of the cross cut device 36 exactly matches a cross cut line, with a control roller 51 located at its center position of its movable range.

On the sheet panel, the dimension between the mark(s) M and an area(s) to be cross-sealed (hereinafter referred to as "cross seal area") is also predetermined. Each of the point seal devices 31, the cross seal devices 32, and the cooling devices 33 is positioned such that its processing position (point sealing position, cross sealing position, or cooling position) matches a cross seal area when the first sensor 40 just detects a mark M (that is, when the sensor 40 is located at the reference position).

The first pair of drive rollers 42 is disposed downstream of the cooling devices 33 and upstream of the punching machines 34 and 35. The first pair of drive rollers 42 intermittently rotates when driven by a drive source (not illustrated), such as a servo motor, and thereby can intermittently feed the sheet panels 10 and 11 sandwiched therebetween.

The second sensor 41 is disposed downstream of the first pair of drive rollers 42, more specifically, downstream of the punching machines 34 and 35 and upstream of the cross cut device 36 so as to detect the marks M. An optical sensor is used as the second sensor 41 and functions in the same manner as the first sensor 40. The second sensor 41 is positioned such that a mark M is located at the detection area (reference position) of the second sensor 41 when the cross cutting position of the cross cut device 36 exactly matches a cross cut line.

On the sheet panel, the dimension between the mark(s) M and area(s) to be punched (hereinafter referred to as "punch area") is also predetermined. Each of the punching machines 34 and 35 is positioned such that its punching position matches a punch area when the second sensor 41 just detects a mark M (that is, when the sensor 41 is located at the reference position).

The control unit 44 includes, for example, a controller or motor driver. Both sensors 40 and 41 and both pairs of drive rollers 42 and 43 are electrically connected to the control unit 44.

The control unit 44 receives the output signals from the first sensor 40 and, based on this output, controls the first pair of drive rollers 42 via the motor, specifically, the feed rate (distance) of the sheet panels 10 and 11 which is provided by the first pair of drive rollers 42. Thereby, it intermittently feeds the sheet panels 10 and 11 at the actual print pitch at the position of the first sensor 40, even if the print pitch fluctuates or varies due to some factor. More specifically, if the control unit 44 determines that the feed of the sheet panels 10 and 11 has advanced relative to the design value at the position of the first sensor 40, it decreases the feed distance to be provided by the first pair of drive rollers 42, by the advanced distance which has been measured by the first sensor 40. Conversely, if the control unit 44 determines that the feed of the sheet panels 10 and 11 has delayed relative to the design value at the position of the first sensor 40, it increases the feed distance to be provided by the first pair of drive rollers 42, by the delayed distance which has been measured by the first sensor 40.

The control unit 44, when pausing the sheet panels 10 and 11, positions the sheet panels 10 and 11 (their cross seal areas) with respect to the point seal devices 31 (theirs point sealing positions), the cross seal devices 32 (their cross sealing positions) and the cooling devices 33 (their cooling positions) through such control using the marks M, the first sensor 40 and the first pair of the drive rollers 42.

The control unit 44 receives the output signals from the second sensor 41 and, based on this output, controls the second pair of drive rollers 43 via the motor, specifically, the feed rate of the sheet panels 10 and 11 which is provided by the second pair of drive rollers 43. Thereby, it intermittently feeds the sheet panels 10 and 11 at the actual print pitch at the position of the second sensor 41, even if the print pitch fluctuates or varies due to some factor. More specifically, if the control unit 44 determines that the feed of the sheet panels 10 and 11 has advanced relative to the design value at the position of the second sensor 41, it decreases the feed distance to be provided by the second pair of drive rollers 43, by the advanced distance which has been measured by the second sensor 41. Conversely, if the control unit 44 determines that the feed of the sheet panels 10 and 11 has delayed relative to the design value at the position of the second sensor 41, it increases the feed distance to be provided by the second pair of drive rollers 43, by the delayed distance which has been measured by the second sensor 41.

The control unit 44, when pausing the sheet panels 10 and 11, positions the sheet panels 10 and 11 (their cross cut line) with respect to the cross cut device (its cross cutting position) through such control using the marks M, the second sensor 41 and the second pair of drive rollers 43. At the same time, this control also causes the sheet panels 10 and 11 (their punch areas) to be positioned with respect to the punching devices 34 and 35 (their punching positions).

For example, the positions of the point seal devices 31, the cross seal devices 32, and the cooling devices 33 at the time when the first sensor 40 just detects a mark M, that is, the default design positions, are predetermined. Where the sheet panels 10 and 11 are made of mono-material with higher stretch, said positions may shift slightly due to conditions such as temperature and humidity. In such cases, an operator may adjust those processing positions (point sealing positions, cross sealing positions, cooling positions) through visual inspection or other means.

In this manner, the implementation positions the sheet panels 10 and 11 (print patterns) with respect to the point seal devices 31 (point sealing positions), the cross seal devices 32 (cross sealing positions), and the cooling devices 33 (cooling positions) using the set of the first sensor 40 and the first pair of drive rollers 42. These devices 31 to 33 are hereinafter referred to as the first processing devices.

It positions the sheet panels 10 and 11 (print patterns) with respect to the cross cut device 36 (cross cutting position) and the punching devices 34 and 35 (punching positions) using the set of the second sensor 41 and the second pair of drive rollers 43. These devices 34 to 36 are hereinafter referred to as the second processing devices.

Since the first sensor 40 is located near the first processing devices, the print patterns can be positioned with respect to the processing positions of the respective first processing devices with high accuracy. Since the second sensor 41 is located near the second processing devices, the print patterns can be positioned with respect to the processing positions of the respective second processing devices with high accuracy. Therefore, the print patterns can be positioned with respect to the processing positions of both first and second processing devices with high accuracy. Accordingly, the bag making apparatus in the implementation can make bags each with a print pattern and good appearance even if the print pitch varies due to environmental conditions such as heat generated during heat sealing process or the quality of the sheet panels 10 and 11.

The above intermittent feed control may cause the sheet panels 10 and 11 to loosen in the section from the first pair of drive rollers 42 to the second pair of drive rollers 43, for example, if it increases the feed distance provided by the first pair of drive rollers 42 because of delay in the feed of the sheet panels 10 and 11 at the reference position of the first sensor 40 while it decreases the feed distance provided by the second pair of drive rollers 43 because of advance in the feed of the sheet panels 10 and 11 at the reference position of the second sensor 41. Such a situation tends to occur particularly when the sheet panels 10 and 11 are made of mono-material.

Conversely, it may cause the tension of the sheet panels 10 and 11 to exceed the allowable range in the above-mentioned section, if it decreases the feed distance provided by the first pair of drive rollers 42 because of advance in the feed of the sheet panels 10 and 11 at the reference position of the first sensor 40 while it increases the feed distance provided by the second pair of drive rollers 43 because of delay in the feed of the sheet panels 10 and 11 at the reference position of the second sensor 41.

In addition, it is important to manage the tension of the sheet panels 10 and 11 in said section since the tension may differ before and after the pair of drive rollers as a boundary. The bag making apparatus thus includes the following configuration.

Figure 5A:
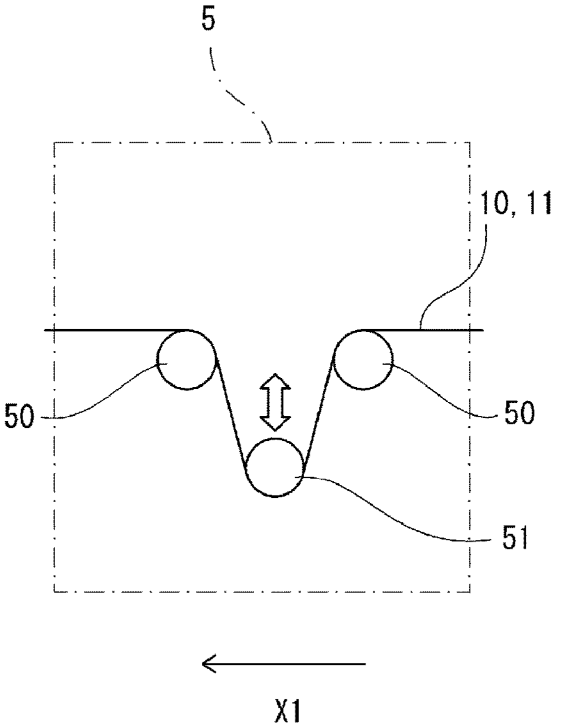
FIG. 5A to FIG. 5C schematically illustrate an adjustment device.

The bag making apparatus includes an adjustment device 5 (FIG. 2A, FIG. 2B disposed downstream of the first sensor 40 and the first pair of drive rollers 42 and upstream of the second sensor 41 and the second pair of drive rollers 43 so as to adjust the tension. The adjustment device 5 is illustrated in detail in FIG. 5A. The adjustment device 5 includes two guide rollers 50 that are spaced apart from one another in the longitudinal direction of the sheet panels 10 and 11 and arranged in a non-displaceable manner to engage with the sheet panels 10 and 11, and a control roller 51 that is located between these guide rollers 50 to engage with the sheet panels 10 and 11. The adjustment device 5 further includes a biasing member (not illustrated) that supports the control roller 51 in displaceable manner in the vertical direction and biases the roller 51 towards the sheet panels 10 and 11 with certain downward biasing force.

Figure 6:
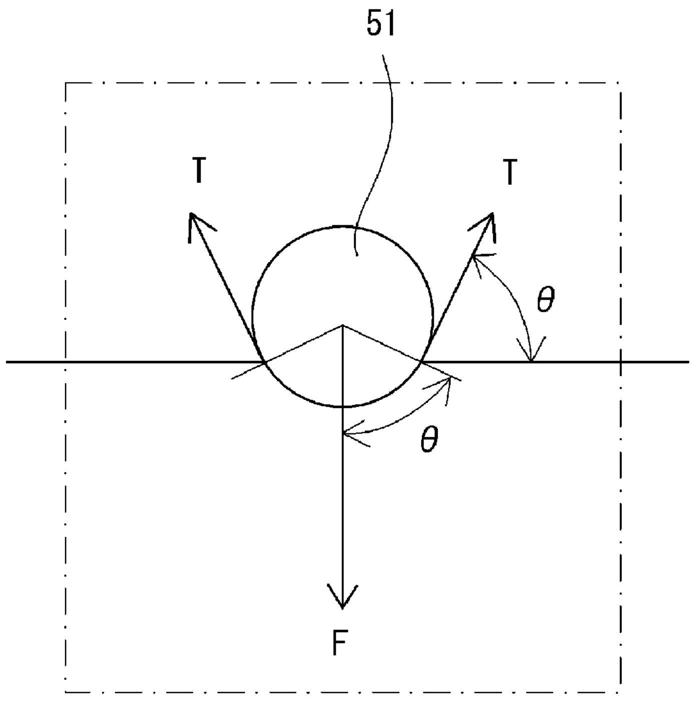
FIG. 6 illustrates relationship between tension and biasing force.

As illustrated in FIG. 6, the following formula is substantially applicable if the engagement angle of the sheet panels 10 and 11 with the control roller 51 is 2θ, the biasing force including the self-weight of the control roller 51 is F, the tension of the sheet panels 10 and 11 is T, and minute force such as frictional force in the direction of roller rotation is negligible. $F=2T\sin\theta$ Therefore, it is possible to maintain the tension of the sheet panels 10 and 11 within an approximate certain range by controlling the biasing force F, such as making the biasing force F smaller when the position of the control roller 51 is higher (θ is smaller) and making the biasing force F larger when the position of the control roller 51 is lower (θ is larger).

In this manner, the tension of the sheet panels 10 and 11 in the section between the pairs of drive rollers 42 and 43 can be managed by the control of the biasing force of the biasing member.

The adjustment device 5 is further configured to detect an upper threshold and a lower threshold for the length of the sheet panels 10 and 11 included in the section from the first pair of drive rollers 42 to the second pair of drive rollers 43 (hereinafter simply referred to as "sheet panel section length"). Although not illustrated, the adjustment device 5 further includes a position sensor for detecting positions of the control roller 51 corresponding to these thresholds.

Figure 5B:
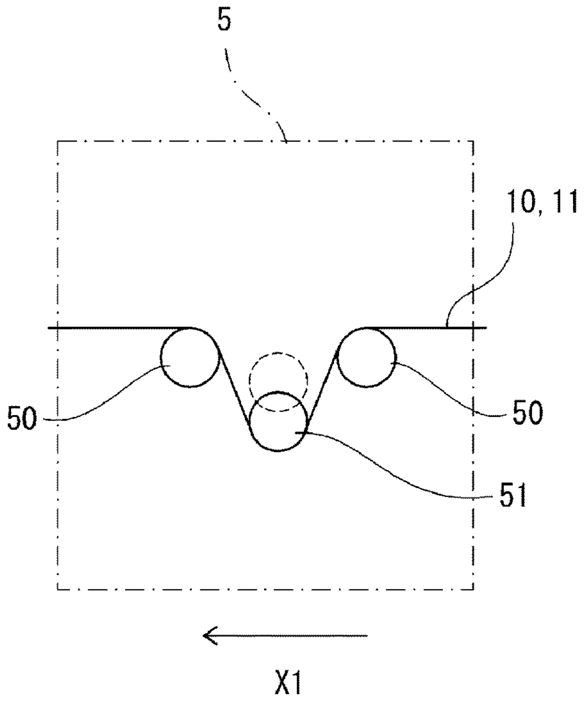
Figure 5C:
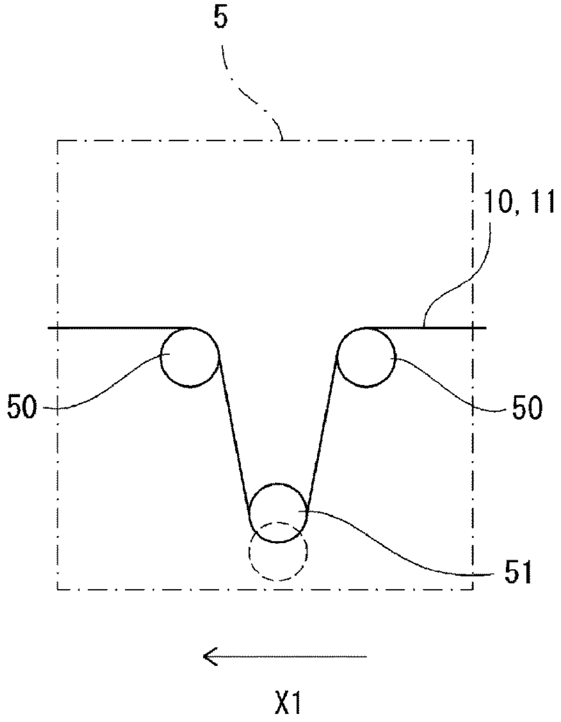

For example, the control roller 51 is located higher (FIG. 5B) when the sheet panel section length becomes shorter, and located lower (FIG. 5C) when the sheet panel section length becomes longer. The sheet panel section length thus corresponds to the vertical position of the control roller 51. Therefore, the adjustment device 5 can detect that the sheet panel section length has reached the lower threshold/upper threshold by detecting that the control roller 51 is at the upper limit position (see dotted line in FIG. 5B)/lower limit position (see dotted line in FIG. 5C) using the position sensor.

The bag making apparatus further includes a movement device 6 (FIG. 2A, FIG. 2B) for moving the first processing devices 31, 32 and 33 and the first sensor 40, as a movable group, in the longitudinal direction of the sheet panels 10 and 11, i.e., upstream and downstream, for a small distance, with respect to the other devices of the bag making apparatus.

The movement device 6, the detail of which is omitted, includes, for example, a frame on which the movable group is mounted, a rack-and-pinion mechanism for moving the frame, and a drive source, such as a motor, for operating the rack-and-pinion mechanism. Alternatively, the movement device 6 may include other known configurations, such as a configuration which has an installed rail and is driven by a worm gear. The movement device 6 operates as follows based on the output of the position sensor of the adjustment device 5.

When the adjustment device 5 detects that the sheet panel section length has reached the lower threshold, i.e., that the control roller 51 is at the upper limit position, during the intermittent feed control performed by the control unit 44, the movement device 6, in response to this, moves the movable group downstream by a small distance, and accordingly changes the intermittent feed distance provided by the first pair of drive rollers 42, thereby moving the control roller 51 downward.

For example, the following is more detailed description of the case where the standard intermittent feed pitch is 100 mm and the moving amount of the movable group is set in increment of 2 mm.

In response to the adjustment device 5 detecting that the control roller 51 is at the upper limit position while the sheet panels 10 and 11 are being paused, the intermittent feed device 4 and the movement device 6 then operate as follows.

The intermittent feed device 4 detects a mark M using the first sensor 40, and determines based on its output, for example, that the feed is 0.5 mm delay. The movement device 6 then moves the movable group by 2 mm downstream after the detection by the first sensor 40, the seal process, and the cooling process.

The intermittent feed device 4 determines the next intermittent feed distance to be provided by the first pair of drive rollers 42 as 102.5 mm (100 mm+0.5 mm+2 mm) based on the output result by the first sensor 40 and the moving distance of the movable group. For the next intermittent feed cycle, the intermittent feed device 4 feeds the sheet panels 10 and 11 by 102.5 mm (the determined intermittent feed distance) using the first pair of drive rollers 42. Here, +0.5 mm is the correction value determined based on the output of the first sensor 40. +2 mm is the correction value determined based on the movement of the movable group, and is thus equal to the distance by which the movable group has moved.

With the position of the first sensor 40 as a reference, the sheet panels 10 and 11 have been fed by such control by 100.5 mm, so that the positions of the point seal device 31, the cross seal devices 32, and the cooling devices 33 are accurately positioned with respect to the marks M. In addition, it causes the extra feed of the sheet panels 10 and 11 by the first pair of drive rollers 42, which corresponds to the downstream moving distance of the movable group (specifically, plus 2 mm), so that the sheet panel section length does not fall below the lower threshold.

In contrast, when the adjustment device 5 detects that the sheet panel section length has reached the upper threshold, i.e., that the control roller 51 is at the lower limit position, during the intermittent feed control performed by the control unit 44, the movement device 6, in response this, moves the movable group upstream by a small distance, and accordingly changes the intermittent feed distance provided by the first pair of drive rollers 42, thereby moving the control roller 51 upward.

In response to the adjustment device 5 detecting that the control roller 51 is at the lower limit position while the sheet panel 10 and 11 are being paused, the intermittent feed device 4 and the movement device 6 then operate as follows.

The intermittent feed device 4 detects a mark M using the first sensor 40, and determines based on its output, for example, that the feed is 0.5 mm delay. The movement device 6 then moves the movable group by 2 mm upstream after the detection by the first sensor 40, the seal process, and the cooling process.

The intermittent feed device 4 determines the next intermittent feed distance to be provided by the first pair of drive rollers 42 as 98.5 mm (100 mm+0.5 mm-2 mm) based on the output result by the first sensor 40 and the moving distance of the movable group. For the next intermittent feed cycle, the intermittent feed device 4 feeds the sheet panels 10 and 11 by 98.5 mm (the determined intermittent feed distance) using the first pair of drive rollers 42. Here, +0.5 mm is the correction value determined based on the output of the first sensor 40. −2 mm is the correction value determined based on the movement of the movable group, and is thus equal to the distance by which the movable group has moved.

Consequently, the point seal devices 31, the cross seal devices 32, and the cooling devices 33 are accurately positioned with respect to the marks M. In addition, it causes the under feed of the sheet panels 10 and 11 by the first pair of drive rollers 42, which corresponds to the upstream moving distance of the movable group (specifically, minus 2 mm), so that the section length of the sheet panels 10 and 11 does not exceed the upper threshold.

As described above, if the movable group is moved, its moving distance is taken into account as a correction value for the intermittent feed distance to be provided by the first pair of drive rollers 42. Therefore, the sheet panel section length never exceeds the range from the lower threshold to the upper threshold, and is thus managed to an appropriate value. And the tension of the sheet panels 10 and 11 can also be managed within a certain range.

The mechanical movable range of the control roller 51 is set wider than the above-mentioned upper/lower limit positions, and the biasing force of the control roller 51 can also be set as appropriate depending on factors such as the material and width of the sheet panels.

The bag making apparatus can also continuously determine the distance from the cross cutting position to the reference position of the first sensor 40 by continuously measuring the moving distance of the movable group. In other words, the bag making apparatus can continuously determine the reference position of the first sensor 40, which changes according to the condition of the sheet panels 10 and 11, which stretch and shrink also due to environmental changes such as temperature and humidity.

The moving distance and the timing of moving the movable group can be set as appropriate. For example, the movable group may be moved in increment of 3 mm or 5 mm. And if the fluctuation range of the section length of the sheet panels 10 and 11 is large, it may be moved by 2 or 3 increments.

The above configuration enables not only positioning with high accuracy for each group of processing devices controlled by a single sensor, but also proper management of tension in a section from one pair of drive rollers to the next pair of drive rollers. Therefore, stable bag making can be achieved even when making bags from printed packaging material with high stretch.

In particular, the intermittent feed control in the implementation after the process involving heat seal is significantly advantageous since the films constituting the sheet panels 10 and 11 become very stretchable due to the heat generated through the heat seal process.

Where an additional processing device(s) which requires positioning with high accuracy is provided in addition to the respective devices 31-36 of the implementation, the aforementioned intermittent feed control and tension maintenance should be performed under the condition that an additional set of a sensor and a pair of drive rollers is disposed in the vicinity of the additional processing device, and that a movement device is disposed for moving the additional sensor, the additional pair of drive rollers, and the additional processing device together. This allows the sheet panels 10 and 11 to be positioned with respect to the processing position of the additional processing device with high accuracy, and the tension to be properly managed.

Some space is typically provided between the cross seal devices 32/point seal devices 31 and the cooling devices 33 in order for an operator to visually check the cross sealing positions and the point sealing positions. This idle space in the bag making apparatus is utilized to locate the first sensor 40 and its movable unit.

Two continuous sheet panels 10 and 11 may be formed as a result of folding the web 1 in half in its longitudinal direction without slitting it. In this case, the two continuous sheet panels 10 and 11 are jointed to each other via the fold line. For this type of bag making, the longitudinal seal device 30 is omitted.

The component supply device 23 may supply to the sheet panels 10 and 11 another kind(s) of accessory component, such as a gusset (a bottom gusset, a top gusset, a side gusset) in addition to and/or instead of the zipper 12. The longitudinal seal device 30 and the cross seal devices 32 may heat seal the sheet panels 10 and 11 with the gusset interposed between them. It should be easily appreciated by those skilled in the art that the above intermittent feed control can be applied to various types of bag making other than the implementations.

Films of mono-material are more stretchable, have a lower melting point, and make it more difficult to control sealing temperature and feed rate than laminated films. In addition, films of mono-material often have variations in quality. This means that films of mono-material are more difficult to be positioned during bag making than laminated films. Since the implementations can provide positioning with higher accuracy even if the sheet panels 10 and 11 are stretched as described above, it is particularly advantageous for bag making using a film(s) of mono-material. Since the flexible packaging industry has been reconsidering bag making using a film(s) of mono-material from the viewpoint of recycling, the bag making in the implementations is significantly advantageous.

Films of mono-material generally have a lower melting point than laminated films. Therefore, when films of mono-material is used, the two upstream point seal devices 31 should heat the sheet panels 10 and 11 at a lower temperature than that for laminated films to reduce damage to the sheet panels 10 and 11. The two cross seal devices 32 may then further heat and pressurize the crushed area of the zipper 12 to make the thickness of the crushed area even thinner, while reducing damage to the sheet panels 10 and 11. Then, the most downstream point seal device 31 may further pressurize the area that has been softened and crushed through heating and pressurization. This ensures leak-tight seal.

Where films of mono-material are used as the sheet panels 10 and 11, their high stretching property can be utilized to omit the adjustment device 5 from the bag making apparatus. Positioning is performed using the first sensor 40 at the position of the first pair of drive rollers 42 and using the second sensor 41 at the position of the second pair of drive rollers 43. Therefore, the number of pitches of the sheet panels 10 and 11 included in the section from the first pair of drive rollers 42 to the second pair of drive rollers 43 is constant. Accordingly, it is sufficient to apply a certain amount of tension to the sheet panels 10 and 11 at the initial state. Even if the sheet panels 10 and 11 stretch or shrink, the number of pitches included in the aforementioned section remains constant, preventing the punching positions of the punching machines 34 and 35 from shifting with respect to the sheet panels 10 and 11.

In other words, if the actual print pitch is shorter than the initial print pitch, due to either its unevenness or shrinkage of the sheet panels 10 and 11, the sheet panels 10 and 11 will be stretched in this section to increase tension, but the print position will not shift with respect to the punching position. In contrast, if the actual print pitch is longer than the initial print pitch, due to either its unevenness or stretching of the sheet panels 10 and 11, the tension applied to the sheet panels 10 and 11 in this section will be relaxed to fall below the initial value, preventing the print position from shifting with respect to the punching position.

The initial tension is determined by consideration of the physical properties of the sheet panels 10 and 11, such that even if the sheet panels 10 and 11 stretch or shrink, this can be canceled by adjustment in tension. If the sheet panels 10 and 11 stretch too much to sag, or shrink too much to be tense, this can be addressed by the movement of the movable group.

In this manner, positioning with a larger tension fluctuation range of the sheet panels 10 and 11 results in increased positioning accuracy against uneven printing, but results in greater tension variation during the seal process. Consequently, the quality of the seal process tends to be unstable.

Conversely, keeping the tension fluctuation range smaller using the adjustment device 5 results in the smaller tension variation during the seal process. Consequently, the quality of the seal process will be stabler. However, the adjustable range using the tension is limited if there is unevenness in printing. In such cases, the tension can be adjusted by the movement of the movable group.

Paper-based sheet panels hardly stretch or shrink compared to plastic-based sheet panels. Thus, if there is an uneven print pitch in the paper-based sheet panel(s), it is difficult to address this using tension control. The bag making apparatus exemplified in the drawings can accurately position the point seal devices 31, the cross seal devices 32, and the cooling devices 33 with respect to the marks M utilizing the movement of the movable group, without tension control.

What is claimed is:

1. A bag making apparatus for cross-cutting at least two continuous sheet panels in a width direction of the sheet panels to successively make bags from the sheet panels, at least one of the sheet panels comprising marks repeatedly printed thereon, the bag making apparatus comprising:

- an intermittent feed device configured to feed the sheet panels in a longitudinal direction of the sheet panels in a state in which the sheet panels are superposed on each other;
- at least one first processing device configured to process the sheet panels during every pause phase of an intermittent feed cycle;
- at least one second processing device configured to process the sheet panels during every pause phase of an intermittent feed cycle; and
- an adjustment device disposed downstream of the at least one first processing device and upstream of the at least one second processing device,
- the intermittent feed device comprising:
  - a first sensor disposed upstream of the adjustment device to detect the marks;
  - a first pair of drive rollers disposed upstream of the adjustment device to feed the sheet panels in the longitudinal direction of the sheet panels;
  - a second sensor disposed downstream of the adjustment device to detect the marks; and
  - a second pair of drive rollers disposed downstream of the adjustment device to feed the sheet panels in the longitudinal direction of the sheet panels, the intermittent feed device being configured to:
- control the first pair of drive rollers based on output of the first sensor to position the sheet panels with respect to the at least one first processing device when pausing the sheet panels; and
- control the second pair of drive rollers based on output of the second sensor to position the sheet panels with respect to the at least one second processing device when pausing the sheet panels,
- wherein the adjustment device is configured to detect an upper threshold and a lower threshold for a length of the sheet panels included in a section from the first pair of drive rollers to the second pair of drive rollers,
- wherein the bag making apparatus further comprises a movement device for moving the at least one first processing device and the first sensor together as a movable group in the longitudinal direction of the sheet panels, wherein the movement device is configured to move the movable group upstream in response to the adjustment device detecting the upper threshold and to move the movable group downstream in response to the adjustment device detecting the lower threshold, and wherein the intermittent feed device is further configured to, if the movable group is moved, determine an intermittent feed distance based on a moving distance of the movable group in addition to the output from the first sensor to feed the sheet panels by the determined intermittent feed distance using the first pair of drive rollers.

2. The bag making apparatus of claim 1, wherein the at least one first processing device comprises:

a cross seal device configured to heat-seal the sheet panels in the width direction of the sheet panels during every pause phase of an intermittent feed cycle; and a cooling device configured to, during every pause phase of an intermittent feed cycle, cool an area that has been heat-sealed by the cross seal device.

3. The bag making apparatus of claim 1, wherein the at least one second processing device comprises a cross cut device configured to cross-cut the sheet panels in the width direction of the sheet panels during every pause phase of an intermittent feed cycle.

4. The bag making apparatus of claim 3, wherein the at least one second processing device further comprises at least one punching machine configured to punch the sheet panels during every pause phase of an intermittent feed cycle.

5. The bag making apparatus of claim 4, wherein the at least one punching machine comprises at least one of a notch forming device for forming notches of the bags or a corner cut forming device for forming corner cut parts of the bags.

6. The bag making apparatus of claim 1, wherein the adjustment device comprises:

two guide rollers spaced from one another in the longitudinal direction of the sheet panels to engage with the sheet panels;

a control roller located between the two guide rollers to engage with the sheet panels;

a biasing member for biasing the control roller towards the sheet panels; and a position sensor for detecting a position of the control roller corresponding to the upper threshold and a position of the control roller corresponding to the lower threshold.

7. A bag making method for cross-cutting at least two sheet panels in a width direction of the sheet panels to successively make bags from the sheet panels, at least one of the sheet panels comprising marks repeatedly printed thereon, the bag making method comprising:

intermittently feeding the sheet panels in a longitudinal direction of the sheet panels using a first pair of drive rollers and a second pair of drive rollers disposed downstream of the first pair of drive rollers, the sheet panels being superposed on each other;

detecting a length of the sheet panels included in a section from the first pair of drive rollers to the second pair of drive rollers using an adjustment device located in the section;

processing the sheet panels during every pause phase of an intermittent feed cycle using at least one first processing device disposed upstream of the adjustment device; and processing the sheet panels during every pause phase of an intermittent feed cycle using at least one second processing device disposed downstream of the adjustment device, the step of intermittently feeding the sheet panels comprising:

detecting a mark using a first sensor disposed upstream of the adjustment device;

controlling the first pair of drive rollers based on output of the first sensor to position the sheet panels with respect to the at least one first processing device when pausing the sheet panels;

detecting a mark using a second sensor disposed downstream of the adjustment device; and controlling the second pair of drive rollers based on output of the second sensor to position the sheet panels with respect to the at least one second processing device when pausing the sheet panels;

the bag making method further comprising:

moving the at least one first processing device and the first sensor together as a movable group upstream using a movement device in response to the length reaching a predetermined upper threshold;

moving the movable group together downstream using the movement device in response to the length reaching a predetermined lower threshold; and determining an intermittent feed distance based on a moving distance of the movable group in addition to the output from the first sensor to feed the sheet panels by the determined intermittent feed distance using the first pair of drive rollers if the movable group is moved.

8. The bag making method of claim 7, wherein each of the sheet panels is a film made of mono-material.

9. The bag making method of claim 7, wherein the at least one first processing device comprises:

a cross seal device configured to heat-seal the sheet panels in the width direction of the sheet panels during every pause phase of an intermittent feed cycle; and a cooling device configured to, during every pause phase of an intermittent feed cycle, cool an area that has been heat-sealed by the cross seal device, and wherein the at least one second processing device comprises a cross cut device configured to cross-cut the sheet panels in the width direction of the sheet panels during every pause phase of an intermittent feed cycle.

* * * * *